US011125649B2

(12) United States Patent
Hell et al.

(10) Patent No.: US 11,125,649 B2
(45) Date of Patent: Sep. 21, 2021

(54) DRIVE TRAIN TEST STAND HAVING A MODULAR DESIGN FOR ELECTRIC MOTOR VEHICLE DRIVES

(71) Applicant: ZF Friedrichshafen AG, Friedrichshafen (DE)

(72) Inventors: Christian Hell, Untergriesbach (DE); Stefanie Nodes, Obernzell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 115 days.

(21) Appl. No.: 16/465,265

(22) PCT Filed: Nov. 8, 2017

(86) PCT No.: PCT/EP2017/078544
§ 371 (c)(1),
(2) Date: May 30, 2019

(87) PCT Pub. No.: WO2018/103981
PCT Pub. Date: Jun. 14, 2018

(65) Prior Publication Data
US 2019/0391043 A1    Dec. 26, 2019

(30) Foreign Application Priority Data
Dec. 5, 2016 (DE) .................... 10 2016 224 142.7

(51) Int. Cl.
*G01M 13/025* (2019.01)
(52) U.S. Cl.
CPC ................. *G01M 13/025* (2013.01)

(58) Field of Classification Search
CPC ............................ G01M 13/025; G01M 15/02
See application file for complete search history.

(56) References Cited

U.S. PATENT DOCUMENTS

| 3,592,053 | A | * | 7/1971 | Lucia | ..................... | G01M 15/02 |
| | | | | | | 73/66 |
| 3,834,221 | A | * | 9/1974 | Swis | ................... | G01M 15/044 |
| | | | | | | 73/116.02 |
| 3,903,737 | A | * | 9/1975 | Burden | ................ | G01R 31/343 |
| | | | | | | 73/114.59 |

(Continued)

FOREIGN PATENT DOCUMENTS

| DE | 19 15 896 A1 | 10/1970 |
| DE | 16 13 413 A1 | 2/1972 |

(Continued)

OTHER PUBLICATIONS

"Combined Alternator End Frame and Engine Mounting Bracket", Research Disclosure, Kenneth Mason Publications, Hampshire, UK, GB, No. 304, Aug. 1, 1989, p. 620, See International Search.

(Continued)

*Primary Examiner* — Eric S. McCall
(74) *Attorney, Agent, or Firm* — Finch and Maloney, PLLC; Michael J. Bujold

(57) ABSTRACT

A modular drive train test stand (1) for electric motor vehicle drives (9). The drive train test stand (1) has at least a motor module (2). The drive train test stand (1) is characterized in that the electric motor (3) of the motor module (2) has a housing with a yoke (4) for supporting the electric motor (3).

9 Claims, 3 Drawing Sheets

(56) References Cited

U.S. PATENT DOCUMENTS

| | | | | |
|---|---|---|---|---|
| 3,938,377 | A * | 2/1976 | Converse, III | G01M 15/02 73/114.71 |
| 4,062,234 | A * | 12/1977 | Bartlett, Jr. | G01L 3/18 73/862.11 |
| 4,680,975 | A * | 7/1987 | Dodt | G01M 15/044 73/862.09 |
| 4,862,736 | A * | 9/1989 | Treitz | G01M 13/02 73/117.01 |
| 4,898,026 | A * | 2/1990 | Damitz | G01M 13/026 73/115.01 |
| 4,932,628 | A * | 6/1990 | Pacheco | B25H 1/0007 248/129 |
| 5,851,007 | A * | 12/1998 | Swartzlander | G01M 15/02 269/17 |
| 7,726,183 | B2 | 6/2010 | Erlach et al. | |
| 10,088,033 | B2 | 10/2018 | Thelen | |
| 2002/0170344 | A1 * | 11/2002 | Pallozzi | G01M 15/10 73/116.02 |
| 2005/0044933 | A1 * | 3/2005 | Laws | G01M 15/046 73/114.24 |
| 2008/0126889 | A1 * | 5/2008 | Barnes | G01M 13/02 714/704 |
| 2012/0042720 | A1 * | 2/2012 | Bastian | G01M 17/10 73/115.07 |
| 2013/0055804 | A1 * | 3/2013 | Praising | G01M 13/021 73/116.01 |
| 2015/0040654 | A1 | 2/2015 | Khateri | |
| 2017/0328812 | A1 * | 11/2017 | Zhang | G01M 17/007 |
| 2018/0299347 | A1 * | 10/2018 | Frohler | G01M 13/022 |
| 2019/0331554 | A1 * | 10/2019 | Hell | F16H 57/025 |
| 2019/0391042 | A1 * | 12/2019 | Hell | H02K 5/00 |

FOREIGN PATENT DOCUMENTS

| | | |
|---|---|---|
| DE | 33 11 618 A1 | 10/1984 |
| DE | 43 28 537 A1 | 3/1995 |
| DE | 10 2007 040 106 A1 | 2/2009 |
| DE | 10 2008 062 181 B3 | 4/2010 |
| DE | 10 2009 020 182 A1 | 11/2010 |
| DE | 10 2010 055 573 A1 | 6/2012 |
| DE | 10 2012 018 359 A1 | 3/2013 |
| DE | 10 2012 007 576 A1 | 10/2013 |
| DE | 10 2015 101 885 A1 | 8/2016 |
| EP | 2 957 885 A1 | 12/2015 |
| GB | 2 327 817 A | 2/1999 |
| WO | 2005/116604 A1 | 12/2005 |

OTHER PUBLICATIONS

German Search Report Corresponding to 10 2016 224 138.9 dated Nov. 20, 2017.
German Search Report Corresponding to 10 2016 224 1427 dated Aug. 3, 2017.
International Search Report Corresponding to PCT/EP2017/078529 dated Jan. 30, 2018.
International Search Report Corresponding to PCT/EP2017/078544 dated Mar. 26, 2018.
Written Opinion Corresponding to PCT/EP2017/078529 dated Jan. 30, 2018.
Written Opinion Corresponding to PCT/EP2017/078544 dated Mar. 26, 2018.

* cited by examiner

DRIVE TRAIN TEST STAND HAVING A MODULAR DESIGN FOR ELECTRIC MOTOR VEHICLE DRIVES

This application is a National Stage completion of PCT/EP2017/078544 filed Nov. 8, 2017, which claims priority from German patent application serial no. 10 2016 224 142.7 filed Dec. 5, 2016.

FIELD OF THE INVENTION

The invention concerns a modular drive train test stand for an electric motor vehicle transmission.

BACKGROUND OF THE INVENTION

Transmission test stands or drive train test stands for testing motor vehicle transmissions or complete motor vehicle drive trains are known through the state of technology. Such test stands are, on one hand, used to detect malfunctions in drive trains after its production through a sequence of load tests. Typical malfunctions arise for instance through parts which have play, for instance gear wheels, synchronizer rings, synchronizer bodies, multi-plate clutch disks and shafts, which can be deflected or even excited for vibration. Within the functional tests, the acoustic behavior and the shift quality are also tested. On the other hand, such test stands are also used in the development and steady improvements of motor vehicle drive trains, as well as, in particular, motor vehicle transmissions. Particular attention is usually paid here to fatigue strength as well as the basic development of new technical principles of action. Usually, such transmission test stands or drive train test stands include an electric motor as the drive unit.

In this context, DE 10 2012 018 359 A1 describes a drive cycle for a driving simulation, which is driven by a real motor vehicle on a roller test bench. The drive train of the motor vehicle gear hereby works in a way that the wheel rotational speed of a motor vehicle matches the respective predetermined speed of the drive cycle, without any real movement of the motor vehicle. This enables testing the motor vehicle drive train after installation into the motor vehicle.

DE 43 28 537 C2 teaches a transmission test bench with a first servomotor, serving as the drive motor, and a second servomotor which serves as a brake motor. The first drive motor is connected via a clutch with the driveshaft of the motor vehicle which is to be tested and is here, in regard to its rotational speed, connected to a PC, whereby any desirable rotational speed patterns can be simulated. The brake motor is connected through another clutch with an output shaft of the motor vehicle transmission which is to be tested. The rotational speed of the second motor is also controlled through the PC. The simulated rotational speed patterns controlled by the PC are rotational speed patterns which had been measured in real drive tests. Thus, the motor vehicle transmission, in accordance with the DE 43 28 537 C2 can also be tested prior to installation in a motor vehicle.

The known drive train test stands are insofar disadvantageous in that they are generally not suitable for testing electric drive trains. In addition, the known drive train test stands are less flexible and are adapted to a specific drive train. The testing of other drive trains is generally not possible, or only possible through at the cost of a large installation effort.

SUMMARY OF THE INVENTION

It is the object of the present invention to propose a modular drive train test stand for electric motor vehicle drives.

This object is achieved by the modular installable drive train test stand for electric motor vehicle drives in accordance with the independent claim(s). Advantageous embodiments result from the dependent claims.

The invention concerns a modular drive train test stand for electric motor vehicle drives, whereby the drive train test stand has at least one motor module. The inventive drive train test stand is characterized by the fact that an electric motor of the motor module has a housing with at least one yoke to support the electric motor.

This results in the advantage that the motor module is constructed to be particularly rigid and thus allows correspondingly high rotational speeds of the electric motor without test stand vibrations of the drive train test stand occurring during operation of the drive train test with disturbing intensity during the test procedure. Since electric motor vehicle drives or their electric motors, respectively, provide output rotational speeds of more than 20,000 rpm, which goes well beyond the rotational speed range of conventional combustion drives, there are on one hand special requirements, with regard to the rigidity and vibration damping, for the drive train test stands for electric motor vehicle drives. On the other hand, there are also special requirements regarding the design of the electric motors used, since when regularly testing electric drive trains, there is a regular need to pass the output shafts of the test sample with only a small wheelbase below or laterally along the electromotor. A conventional drive train test stand is therefore very unsuitable for testing electric motor vehicle drives, in particular with regard to the known electric motors. The known types of electric motors used are usually formed either as so-called base design and a so-called flange design. The single-sided flange electric motors are already unsuitable for testing electric motor vehicle drives simply due to the absolutely insufficient rigidity. The electric motors with a base design, however, do not allow the passing by of drive shafts of the tested parts with only a small axis distances below or laterally of the electric motor.

However, the inventive motor module overcomes these disadvantages. Through the inventive design of the housing with at least one yoke, the electric motor can be supported via the at least one yoke, which enables a particularly high rigidity of the entire motor module. Also, the space below the electric motor or laterally of the electric motor remains open, so that this space can be used to pass by an output shaft of the tested part.

Preferably, it is provided that the electric motor of the motor module can be exchanged as required, so that the electric motor can be connected via a standardized connection to the motor module. This allows a simple way and as required, to provide a higher powered or lower powered electric motor with a required rotational speed or a required torque.

The yoke can hereby be designed as one piece with the housing, but can also be screwed or welded together.

Also, the yoke can be designed as a transversal yoke, as a ring yoke, or also as a frame yoke.

The yoke, in turn, is supported preferably on a massive base of the motor module.

Preferably, the yoke has in addition a transverse reinforcement in order to further improve the overall rigidity of the motor module and thus the vibration damping of the motor module.

Especially preferred, the base is made from Hydropol material which is very well suited for vibration damping.

It is also preferred that the motor module is designed in a way that a first resonant frequency of the motor module is above the first rotational order of the electric motor. At a rotational speed of 20,000 rpm, the resonant frequency of the motor module should be above approximately 470 Hz. This value has proven itself as especially suitable during testing of high-speed electric motor vehicle drives.

The inventive drive train test stand for electric motor vehicle drives is equally suitable for so-called active testing, as well as for so-called passive testing, wherein the term active test being understood to mean testing of an electric motor vehicle drive with an electric drive motor, and the term passive test being understood to mean a test of an electric motor vehicle without an electric drive motor. The inventive test stand is therefore equally suitable for testing the transmission or the bearings of the electric motor vehicle drive, as well as for testing the electric drive of the electric motor vehicle drive.

It is preferably provided that the electric motor of the motor module designed to have comparatively slim construction to guarantee as much free space as possible below or laterally of the electric motor. It is in particular provided that the electric motor or the housing of the electric motor, respectively, has a diameter of less than 270 mm.

This allows the testing of coaxially constructed electric motor vehicle drives, as well as of axially-parallel constructed electric motor vehicle drives. In coaxially constructed electric motor vehicle drives, the output shaft is spatially positioned within the electric drive, meaning coaxially to the electric drive. Generally, the output shaft is in addition coaxially positioned in a hollow shaft which serves as the driveshaft. Also, this driveshaft is coaxially positioned in the electric drive. In axially-parallel constructed electric motor vehicle drives, the output shaft is positioned outside of the electrical drive, meaning axially-parallel to the motor shaft of the electric drive.

Depending on the design of the electric motor, it can be preferably air cooled or water cooled, or any combination of air- and water cooling.

In accordance with a preferred embodiment of the invention, it is provided that the drive train test stand has also a test part receptacle module, whereby the test part receptacle module is at least adjustable with regard to length, height, and transversely. When the test part receptacle module can be adjusted in length, height, and laterally, a fine adjustment of the test part can take place with the test part receptacle module, relative to the motor module. This represents a special advantage with regard to the comparably high rotational speed of more than 20,000 rpm.

It is preferably provided that the test part receptacle module is designed as a so-called cross table, which allows longitudinal and transversal adjustment particularly in steps of 0.01 mm. The adjustment of height is preferably ensured by shims, in particular in steps of 0.05 mm. The shims can have for instance different thicknesses, wherein the different thicknesses differ from each other in steps of 0.05 mm.

The shims are preferably inserted into an adjustable intermediate space which is provided. The adjustable intermediate space can possess hereby for instance a spring-loaded opening mechanism, which tries, by means of a spring force, to open the intermediate space and it can have also a screw mechanism which acts against the spring force and limits by way of the screw position, the opening width of the intermediate space. The further the screws are tightened, the more limited the opening width. However, with an increased loosening of the screws, the opening width increases. In this state, the then required number of shims can be put into the intermediate space. Through tightening of the screws, the shims are clamped and a rigid and vibration damping connection is created.

It is provided and especially preferred that the length, transverse, and height adjustment is possible without crossover interference.

The test part receptacle module has preferably a plurality of brackets, in particular four brackets on which the test part can be mounted.

The test part is the electric motor vehicle drive to be tested.

In accordance with an additional, preferred embodiment of the invention it is provided that the drive train test stand has also an intermediate bearing module, wherein a drive shaft of the intermediate bearing module is supported by a coaxial bearing of the intermediate bearing module and wherein a diameter of the bearing is less than a diameter of the housing of the electric motor. This results in the advantage that more space is available in axial-parallel constructed electric motor vehicles for the output shaft which extends from the test part in the direction of the motor module. Because the diameter of the bearing is less than the diameter of the housing of the electromotor, more dedicated free space becomes available. This is particularly important with especially compact electric motor vehicle drives.

It is preferably provided that the bearing as a diameter of less than 130 mm.

The intermediate bearing module is preferably operationally coupled both with the electric motor of the motor module as well as with the test part. Thus, the intermediate bearing module and transfer both a rotational speed as well a torque from the electromotor to the test part and vice versa.

Another advantage resulting from the use of the interim bearing module can be seen in that, for example, a measuring flange can be positioned for the measurement of torque. Thus, the measurement flange does not need to be positioned on the electric motor, which avoids an unfavorable influence on its vibration behavior.

In accordance with an especially preferred embodiment of the invention, it is provided that the intermediate bearing module can be modified by means of a mounting bracket for receiving a motor test part.

Alternatively preferred, the mounting bracket can also be fixed, meaning inseparably bonded, on the intermediate bearing module, for instance by welding. In this case, the intermediate bearing module can only be used for testing a motor part.

A motor to be tested is meant to be, in the context of the invention, exclusively an electric drive of an electric motor vehicle drive, meaning an electric motor without a transmission.

This creates the advantage that in a simple manner, only the motor test part can be examined. In this case, a rotational speed or torque of the electric motor of the motor module is directly applied to the motor to be tested.

This possibility of testing the motor independently of the transmission, enables a parallel design of the transmission for the electric motor vehicle drive and the electric drive for the electric motor vehicle drive.

It is provided in accordance with an additional, preferred embodiment of the invention that the drive train test stand also includes a transmission module to create a parallel axial offset. The advantage arises in that in a simple manner also coaxially constructed motor vehicle drives can be tested, because the axial offset allows a positioning of the test part laterally offset from the electric motor of the motor module, meaning that an output shaft of the test part can be passed to the electric motor of the motor module. Generally, the drive of the test part takes place via a hollow shaft and the output of the test part via an output shaft which is positioned inside of the hollow shaft.

For the creation of the axial offset, one or several spur gear stages are used. Especially preferred is a transmission ratio of the spur gear of 1:1.

Alternatively preferred, the transmission module also enables reducing or increasing the output rotational speed or output torque of the electric motor of the motor module. The reduction or increase can be matched with the tested part.

To produce the reduction of the increase, one or more spur gear stages are preferably used.

It is provided in accordance with an additional, preferred embodiment of the invention that the drive train test stand also includes a torque measurement module, a climate chamber, and/or a sound chamber.

A climate chamber allows the creation of a desired climate, meaning a certain temperature and maybe a certain humidity for the test part. The climate chamber is preferably constructed around the test part receptacle module or is positioned on the test part receptacle module in a way so that the test part is built-in to the climate chamber.

A sound chamber enables the analysis of an acoustic behavior of the test part and thus the identification of transmission failures or motor failures of the test part. The sound chamber is preferably constructed around the motor module or positioned on the motor module in such a way that the electric motor is enclosed by the sound chamber.

A torque measurement module enables the recording and determination of a created torque. The torque measurement module can hereby include for instance a measurement flange for the mechanical recording of a torque. However, the torque measurement module can also record the motor current and can mathematically determine the torque based on the motor current. Also, the recording of the torque via a lever arm, in conjunction with a force transducer, is possible. The force transducer is preferably designed as a piezo element or as a strain gauge, but, also other embodiments of the force transducer are possible. Likewise, combinations of the different possibilities of torque measurement are conceivable.

The use of a torque measurement module has also the advantage, through an additional consideration of the rotational speed, that the mechanical output power can be recorded. Through a comparison with the input power can the efficiency be determined.

It is provided in accordance with an additional preferred embodiment of the invention that the drive train test stand has also at least one output module. The at least one output module is designed to record an output rotational speed or output torque. Thus, the output torque of the test part, as well as the output rotational speed of the test part can be recorded and analyzed. Both are important prerequisites for a complete test of all characteristics of the test part.

The at least one output module preferably also has an electric motor to provide an adjustable load for the tested part to simulate for instance braking events.

It is preferably provided that each driven wheel, driven by the electric motor vehicle drive train, has their own output module. This allows a test operation which largely matches the real operating conditions of the test part.

It is provided, in accordance with an additional, preferred embodiment of the invention that the test part receptacle module, the intermediate bearing module, the transmission module, and/or the output module can be centered relative to each other by means of a positioning system. That allows a simple and extremely accurate centering of the individual modules to each other.

For instance, a pre-centered mounting of the test part and the test part receptacle module can take place. Thereafter, the test part receptacle module with the test part is brought to the drive train test stand and an especially accurate centering takes place here by means of the positioning system, where the accuracy is preferably in the range of 10 µm.

It is preferably provided that the positioning system is designed with interlocking pins or bolts or fitted keys and respective receptacle openings for the pins or bolts or fitted keys. If, for instance, bolts are positioned at the test part module, which concisely fit into the intermediate bearing module, this results in a highly accurate centering of the two modules in reference to each other.

For an accelerated centering of the test parts and thus for the accelerated a changeability of test parts, the drive train test stand has preferably two or more test part receptacle modules, so that already a pre-centered mounting can take place, while the test part and the other test part receptacle module is being tested.

Preferred alternatively, the test part receptacle module can also have a centering bracket on which the test part is positioned on the test part receptacle module and is centered. Especially preferred are two centering brackets so that a pre-centered test part mounting can already take place on one centering bracket, while a test part is being tested on the other centering bracket.

Due to the large number of mutually combinable or connectable modules, a modular system is provided which allows high flexibility regarding the assembly of the drive train test stand with the individual modules and at the same time, with the already present modules, the production cost for the drive train test stand is kept low. In particular, no construction effort arises.

BRIEF DESCRIPTION OF THE DRAWINGS

The invention will be explained by way of example with reference to embodiments shown in the figures.

These show.

DETAILED DESCRIPTION OF THE PREFERRED EMBODIMENTS

Figure 1:
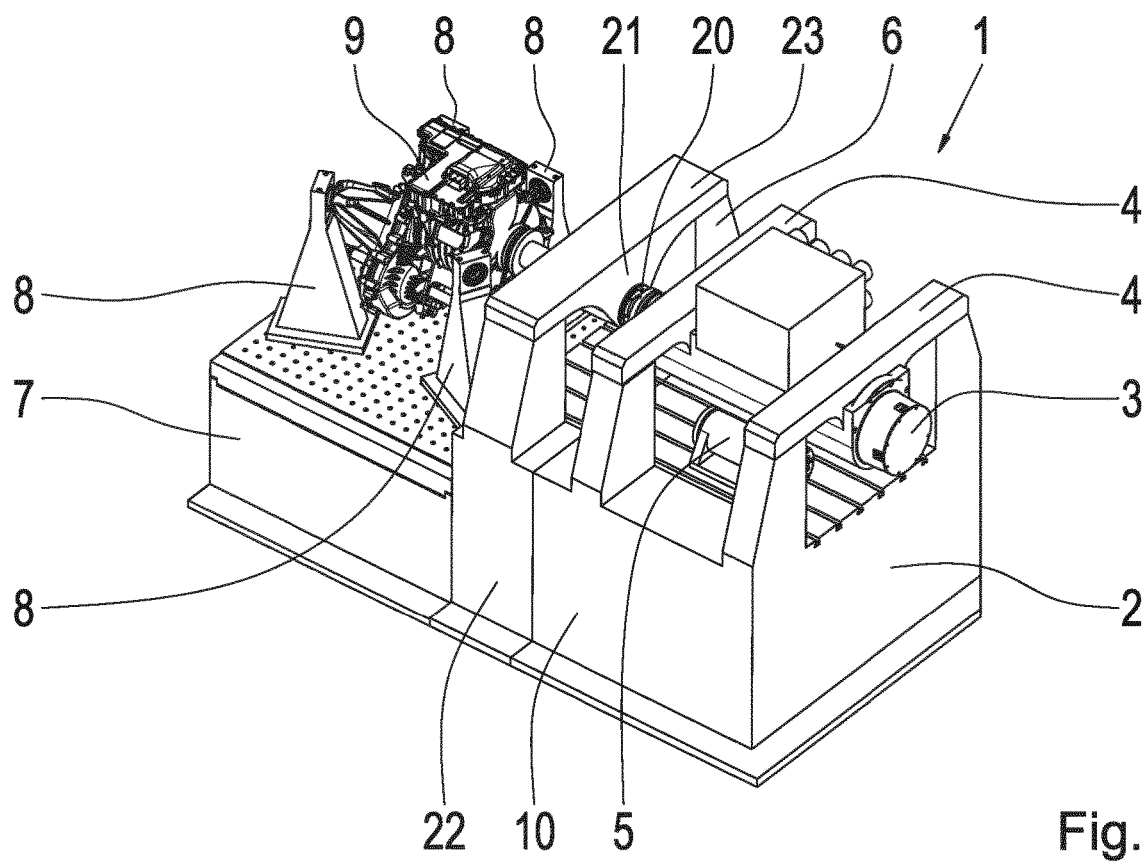
FIG. 1 an example of a possible design of a modular drive train test stand.

Same parts, functional units, and comparable components, and overall drawings are marked with the same reference characters. These parts, functional units, and comparable components are identically presented regarding their technical characteristics, if the description does not show explicitly or implicitly some difference.

FIG. 1 shows an example possible construction of a modular drive train test stand 1 for electric motor vehicle drives 9. The shown drive train test stand 1 in FIG. 1 is comprised of, in accordance with the example, a motor module 2, an intermediate bearing module 6, as well as test part receptacle module 7. The test part receptacle module 7 itself is comprised of four support arms 8. Between the support arms 8, an electric motor vehicle drive 9 is clamped. The shown motor module 2 comprises of an electric motor 3 with a housing, which has a yoke 4 to support the electric motor 4 on the base 10 of the motor module 2. In accordance with the example, the housing of the electric motor 3 and the yoke 4 are designed as one-storied. Since the electric motor 3 is supported by the yoke 4, an especially high rigidity occurs for the entire motor module 2, which is a significant prerequisite for testing the electric motor vehicle drives 9. Due to the very high rotational speeds of such electric motor vehicle drives 9, of up to 20,000 rpm and higher, the high rigidity and the hereby resulting vibration damping are essential while testing the electric motor vehicle drives 9. In addition, another advantage arises because the construction space under the electric motor 3 or laterally of electric motor 3 remains open. In this open construction space, a shaft bearing 5 can now be advantageously positioned which supports an output shaft of the test part 9. An output shaft of the electric motor 3, in accordance with the example, is connected in a rotationally fixed manner with a drive shaft 20 of the intermediate bearing module 6. Also, the drive shaft 20 of the intermediate bearing module 6 is connected in a rotationally fixed manner with the input shaft of the test part 9. Thus, the torque or rotational speed of the electric motor 3 can be transferred through the intermediate bearing module 6 to the test part 9. The drive shaft 20 is hereby positioned in a coaxial bearing 21. The bearing 21 is supported by a yoke 23 on a base 22 of the intermediate bearing module 6. Because of this construction, the intermediate bearing module 6 is also comparably rigid and is excellently suited for damping high-frequency vibrations. The test part 9 is, in accordance with the example, an axially-parallel constructed electric motor vehicle drive 9. In axially-parallel constructed electric motor vehicle drives 9, the output shaft is positioned outside of the electric drive, namely axially in parallel to the motor shaft of the electric drive.

Figure 2:
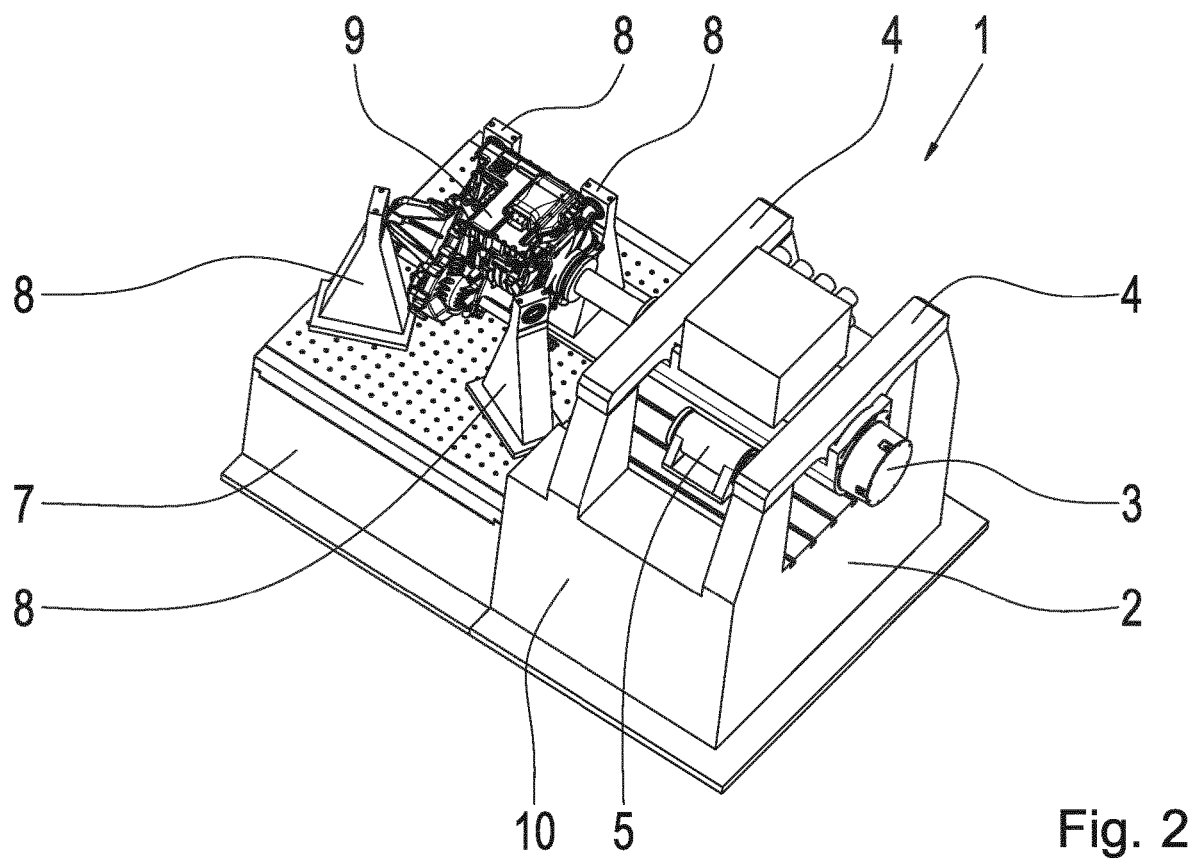
FIG. 2 an additional possible embodiment of a modular drive train test stand according to the invention, FIG. 3 an additional possible embodiment of a modular drive train test stand according to the invention, FIG. 4 schematically and exemplary a section cut through a transmission module, and FIG. 5 schematically the flexibility in the construct of the modular drive train test stand according to the invention.

FIG. 2 shows an additional possible embodiment of the inventive modular drive train test stand 1. The drive train test stand 1 of FIG. 2 differs from the drive train test stand 1 in FIG. 1 only in that it has no intermediate bearing module 6. This allows, on one hand, a comparable, immediate coupling of the electric motor 3 with the test part 9. On the other hand, however, comparatively less free installation space is available for the output shaft of the test part 9, as the diameter of the electric motor 3 is larger than the diameter of the bearing of the drive shaft of the intermediate bearing module 6. The construction as shown in FIG. 3 of the inventive drive train is therefore especially suitable for axial-parallel electric motor vehicle drives 9, where the axle distance between driveshaft and output shaft are comparably large.

Figure 3:
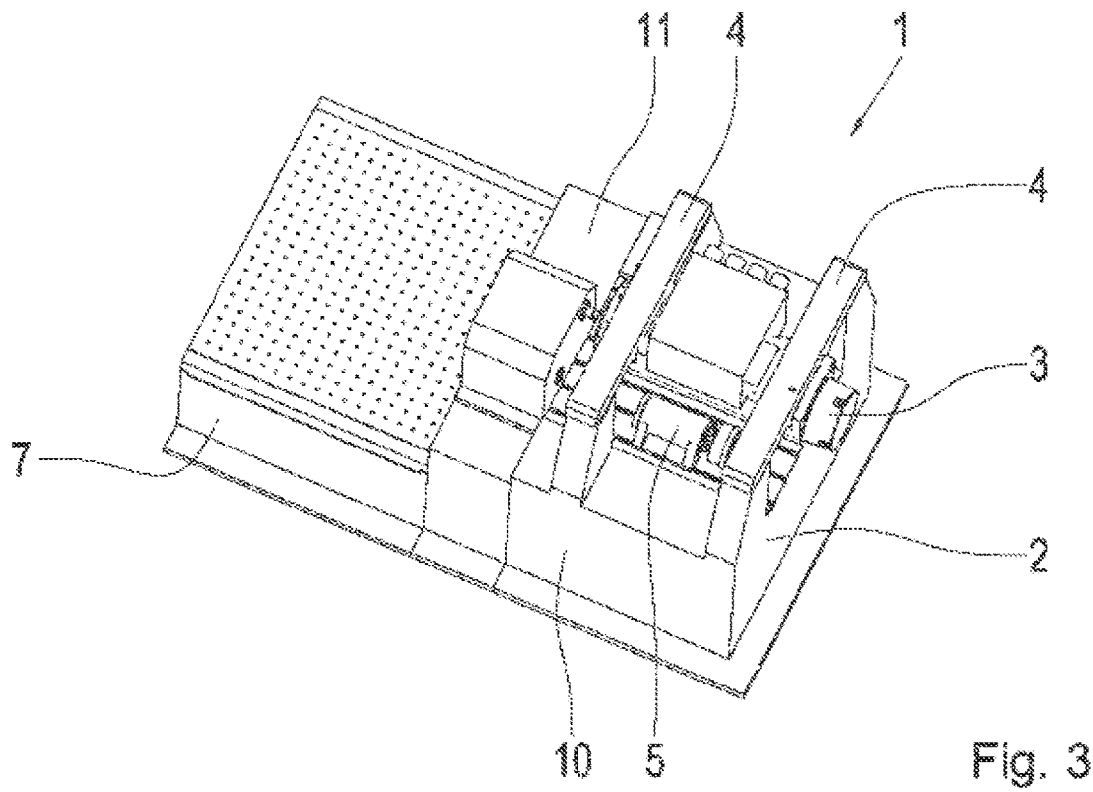

FIG. 3 shows an additional possible embodiment of the inventive, modular drive train test stand 1. The drive train test stand 1 of FIG. 3 differs from the previously shown drive train test stands 1 because it has a transmission module 11 instead of an intermediate bearing module 6. Furthermore, FIG. 3 has no test part 9 placed on the test part receptacle module 7 of the drive train test stand 1. In such coaxially constructed electric motor vehicle drives 9, the output shaft is spatially positioned in the electric drive, namely coaxial to the electric drive. Furthermore, the output shaft is also coaxially positioned in a hollow shaft which serves as a driveshaft. Also this driveshaft is coaxially positioned in the electronic drive. By providing an axial offset of the transmission module 11, the drive shaft of the test part 9, designed as a hollow shaft, can be linked with the electric motor 3. Simultaneously, the output shaft can be brought to the shaft bearing 5.

Figure 4:
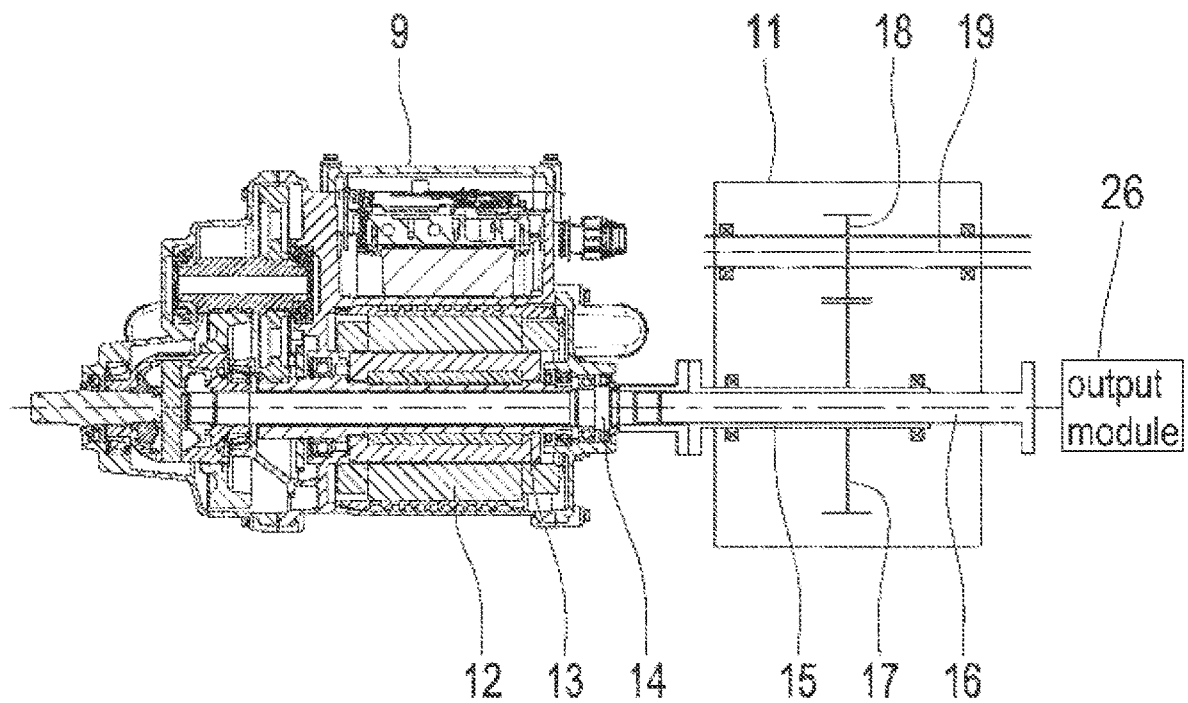

FIG. 4 shows schematically and by way of example a section through a transmission module 11 and a test part 9. The test part 9 has an electric drive 12, a coaxial positioned drive shaft 13 in the electric drive 12 which is designed as hollow shaft 13, as well as a coaxial positioned output shaft 14 in the hollow shaft. The hollow shaft 13 is connected in a rotationally fixed manner with a hollow shaft 15 of the transmission module 11. Also, the output shaft 14 is connected in a rotationally fixed manner with a shaft 16 of the transmission module 11. The shaft 16 is brought from the transmission module 11 to an output module 26 which is shown diagrammatically in FIG. 4. As can be seen further in FIG. 4, a spur gear 17 is connected to the hollow shaft 15 in a rotationally fixed manner. This spur gear 17 meshes with an additional spur gear 18, which is rotationally fixed to the shaft 19. The shaft 19 is then brought from the transmission module 11 to the electric 3 where it can be coupled in a rotationally fixed manner. Thus, the transmission module 11 provides also an axial offset through which a coaxially designed test part 9 can be tested in a simple manner on the drive train test stand 1 according to the invention.

Figure 5:
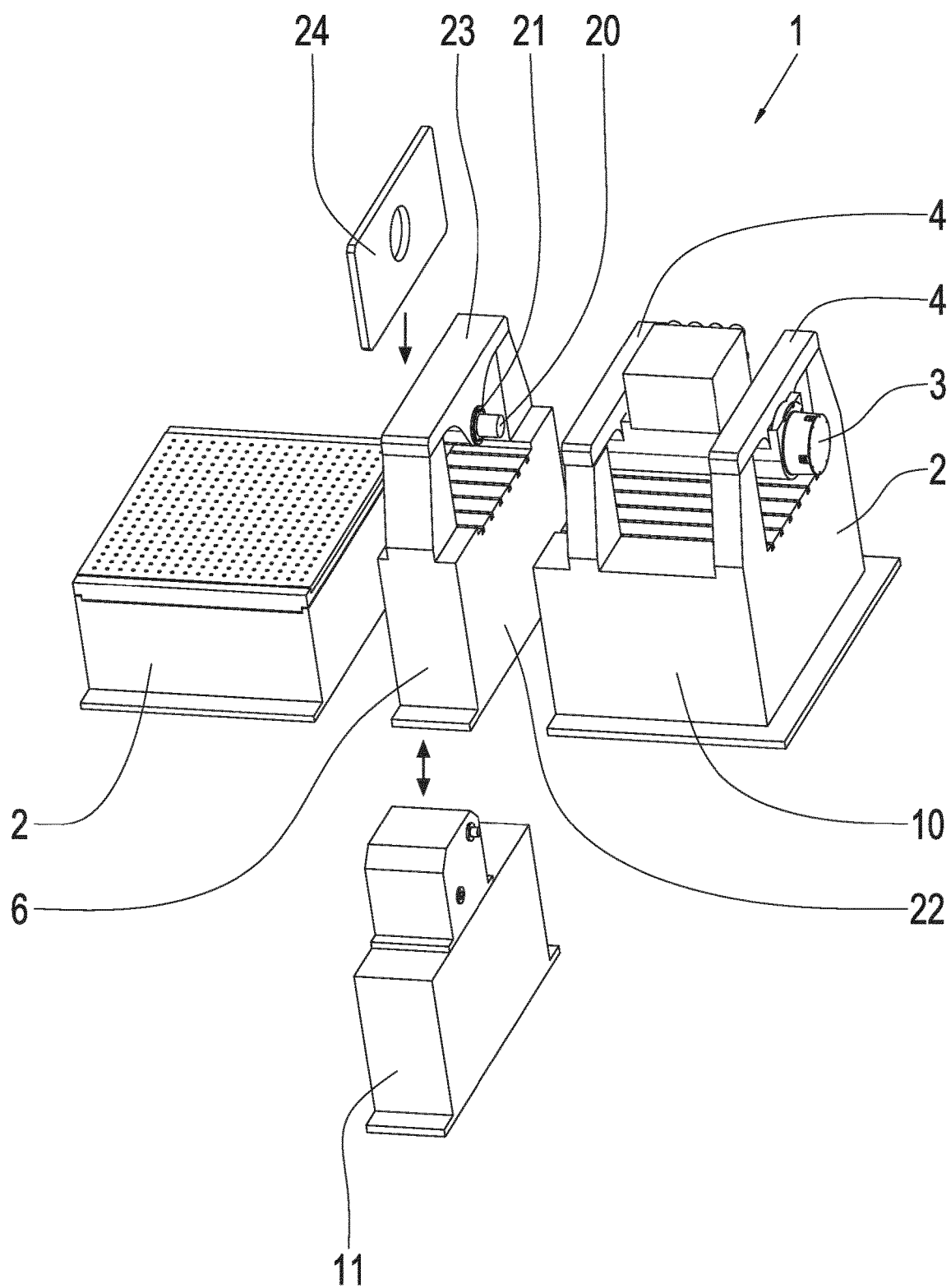

FIG. 5 shows schematically the flexibility in the design of the modular drive train test stand 1 according to the invention. As can be seen in FIG. 5, the drive train test stand 1 comprises a motor module 2, as well as a test part receptacle module 7. Between the motor module 2 and the test part receptacle module 7, an intermediate bearing module 6 or a transmission module 11 can selectively be positioned. The selection of the intermediate bearing module 6 or the transmission module 11 is hereby dependent on the respective requirements of the test part 9 needing to be tested. As it can be seen further in FIG. 5, the intermediate bearing module 6 can be provided with a mounting plate 24. This now allows the accommodation of a motor test part by the intermediate bearing module 6. The motor test part is exclusively the electric drive of the electric motor vehicle drive 9, meaning an electric motor without transmission. This motor test part can now be coupled with the electric motor 3 through the intermediate bearing module 6, and therefore allows testing of the motor test part.

REFERENCE CHARACTERS

1 Modular installable Drive Train Test Stand
2 Motor Module
3 Electro Motor
4 Yoke
5 Shaft Bearing
6 Intermediate Bearing Module
7 Test Piece Receptacle Module
8 Support arm
9 Test Piece, Electric Vehicle Drive
10 Base
11 Transmission Module
12 Electric Drive
13 Hollow Shaft
14 Output Shaft 15 Hollow Shaft
16 Shaft
17 Spur Gear
18 Spur Gear
19 Shaft
20 Drive Shaft
21 Bearing
22 Base
23 Yoke
24 Mounting Plate

The invention claimed is:

1. A modular drive train test stand for an electric motor vehicle drive, the drive train test stand comprising:
   a motor module and at least one additional module, the motor module and the at least one additional module being independent of each other,
   the motor module having a base and an electric motor,
   the electric motor of the motor module having a housing with at least one yoke which suspends the electric motor above the base of the motor module,
   a base of the at least one additional module being selectively connectable to the base of the motor module such that the base of the at least one additional module directly abuts the base of the motor module and the at least one additional module is centered relative to the motor module.

2. The drive train test stand according to claim 1, wherein the at least one additional module is a test part receptacle module, and the test part receptacle module is adjustable at least one of in length, in height, and transversely.

3. The drive train test stand according to claim 1, wherein the drive train test stand further comprises at least one of a torque measurement module, a climate chamber, and a sound chamber.

4. The drive train test stand according to claim 1, wherein the drive train test stand further comprises at least one drive output module.

5. The drive train test stand according to claim 1, wherein the drive train test stand further comprises a positioning system and the at least one additional module comprises at least two of a test part receptacle module, an intermediate bearing module, a transmission module, and a drive module,
   the motor module and the at least two of the test part receptacle module, the intermediate bearing module, the transmission module, and the drive module are centered relative to each other by the positioning system.

6. The drive train test stand according to claim 1, wherein the at least one additional module is an intermediate bearing module, a driveshaft of the intermediate bearing module is supported by a coaxial bearing of the intermediate bearing module, and a diameter of the bearing is smaller than a diameter of the housing of the electric motor.

7. The drive train test stand according to claim 6, wherein the intermediate bearing module has a bracket plate which receives a motor test part of the electric motor vehicle drive being tested.

8. A modular drive train test stand for an electric motor vehicle drive, the drive train test stand comprising:
   a motor module and at least one additional module, the motor module and the at least one additional module being independent of each other,
   the motor module having a base and an electric motor,
   the electric motor of the motor module having a housing with at least one yoke which supports the electric motor above the base of the motor module,
   a base of the at least one additional module being selectively connectable to the base of the motor module such that the base of the at least one additional module directly abuts the base of the motor module and the at least one additional module is centered relative to the motor module, and
   the at least one additional module is a transmission module for creating a parallel axial offset such that an axis of the electric motor is parallel to and offset from an axis of an electric drive of a test part of the electric motor vehicle drive being tested.

9. A modular drive train test stand for testing an electric motor vehicle drive, the drive train test stand comprising:
   a motor module, a test part receptacle module, and at least one of an intermediate bearing module and a transmission module, the motor module, the test part receptacle module, and the at least one of an intermediate bearing module and the transmission module are independent of each other and each has a base
   the motor module having an electric motor;
   the electric motor of the motor module having a housing with at least one yoke;
   the at least one yoke supporting the electric motor on the base of the motor module;
   the at least one of the intermediate bearing module and the transmission module is selectively connectable to the motor module and the test part receptacle module such that the base of the at least one of the intermediate bearing module and the transmission module abuts the base of the motor module and the base of the test part receptacle module.

* * * * *